United States Patent
Inoue et al.

(10) Patent No.: US 11,529,732 B2
(45) Date of Patent: Dec. 20, 2022

(54) ROBOT LINEAR-OBJECT MANAGEMENT STRUCTURE AND ADDITIONAL LINEAR-OBJECT FIXING MEMBER

(71) Applicant: FANUC CORPORATION, Yamanashi (JP)

(72) Inventors: Toshihiko Inoue, Yamanashi (JP); Tomoyuki Motokado, Yamanashi (JP); Wataru Amemiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 390 days.

(21) Appl. No.: 16/734,635

(22) Filed: Jan. 6, 2020

(65) Prior Publication Data
US 2020/0238508 A1 Jul. 30, 2020

(30) Foreign Application Priority Data

Jan. 24, 2019 (JP) .............................. JP2019-010334

(51) Int. Cl.
*B25J 9/12* (2006.01)
*B25J 18/00* (2006.01)
*B25J 9/16* (2006.01)

(52) U.S. Cl.
CPC .............. *B25J 9/123* (2013.01); *B25J 9/1664* (2013.01); *B25J 18/00* (2013.01)

(58) Field of Classification Search
CPC ........................... B25J 19/0025; B25J 9/0009
See application file for complete search history.

(56) References Cited

U.S. PATENT DOCUMENTS

| 2009/0249915 A1* | 10/2009 | Iwai ........................ H02G 3/22 901/28 |
|---|---|---|
| 2010/0162845 A1 | 7/2010 | Yonehara et al. |
| 2012/0312116 A1 | 12/2012 | Yonehara et al. |
| 2014/0083229 A1 | 3/2014 | Kume |
| 2014/0103168 A1 | 4/2014 | Kume |
| 2014/0290415 A1 | 10/2014 | Hasuo |

(Continued)

FOREIGN PATENT DOCUMENTS

| EP | 2 213 425 A1 | 8/2010 |
|---|---|---|
| JP | H04-130192 U | 11/1992 |

(Continued)

OTHER PUBLICATIONS

Japanese Office Action dated Mar. 16, 2021, in connection with corresponding JP Application No. 2019-010334 (11 pp., including machine-generated English translation).

*Primary Examiner* — Dale Moyer
(74) *Attorney, Agent, or Firm* — Maier & Maier, PLLC

(57) ABSTRACT

A linear-object management structure for a robot, where a post-attached linear object is guided via the same path as a basic cable from inside a base and fixed at the position of a first fixing member, is subsequently extended forward beyond the basic cable, through a path closer to a first axis than the basic cable is, is curved in a direction along a first arm, is fixed to a side surface of the first arm, at the position of a second fixing member, such that a certain length margin required for the operation of the first arm is provided between the position of the first fixing member and the position of the second fixing member, and is guided to an upper-side movable portion along the first arm.

6 Claims, 14 Drawing Sheets

(56) References Cited

U.S. PATENT DOCUMENTS

| | | | |
|---|---|---|---|
| 2015/0034698 A1* | 2/2015 | Takahashi | B25J 18/02 901/42 |
| 2016/0067870 A1* | 3/2016 | Kono | F16L 3/23 901/23 |
| 2016/0256999 A1* | 9/2016 | Kinoshita | B25J 9/0024 |
| 2017/0282381 A1 | 10/2017 | Inoue et al. | |
| 2017/0282382 A1 | 10/2017 | Inoue et al. | |
| 2017/0291313 A1 | 10/2017 | Inoue et al. | |
| 2019/0381596 A1 | 12/2019 | Kabushiki | |

FOREIGN PATENT DOCUMENTS

| | | | |
|---|---|---|---|
| JP | 2002307369 | A | 10/2002 |
| JP | 3483862 | B | 1/2004 |
| JP | 2013066271 | A | 4/2013 |
| JP | 2014065110 | A | 4/2014 |
| JP | 2014079818 | A | 5/2014 |
| JP | 5591894 | B | 9/2014 |
| JP | 2014159081 | A | 9/2014 |
| JP | 2014198351 | A | 10/2014 |
| JP | 5698783 | B | 4/2015 |
| JP | 2017-185580 | A | 10/2017 |
| JP | 2017-185597 | A | 10/2017 |
| JP | 2017185573 | A | 10/2017 |
| JP | 6378238 | B | 8/2018 |
| JP | 2018122404 | A | 8/2018 |
| WO | 2009069389 | A1 | 6/2009 |

\* cited by examiner

ROBOT LINEAR-OBJECT MANAGEMENT STRUCTURE AND ADDITIONAL LINEAR-OBJECT FIXING MEMBER

CROSS-REFERENCE TO RELATED APPLICATIONS

This application is based on Japanese Patent Application No. 2019-010334, the content of which is incorporated herein by reference.

FIELD

The present disclosure relates to a linear-object management structure for a robot and an additional linear-object fixing member.

BACKGROUND

There is a known linear-object management structure in which a pipe material is provided between a base and a revolving drum of a robot, along a rotation axis of the revolving drum, and linear objects that have been led out to an upper portion of the revolving drum from inside the base, by being inserted through the interior of the pipe material, are fixed to each of the base, the revolving drum, an upper arm, and a lower arm (for example, Publication of Japanese Patent No. 5591894).

SUMMARY

An aspect of the present disclosure is directed to a robot linear-object management structure for managing a post-attached linear object mounted on a robot including a base that is installed on an installation surface; a revolving drum that is supported so as to be rotatable about a vertical first axis with respect to the base; a first arm that is supported so as to be rotatable about a horizontal second axis with respect to the revolving drum; an upper-side movable portion that is supported at a distal end of the first arm; a hollow portion that penetrates upward from the base through the revolving drum along the first axis; and basic cables for driving the revolving drum, the first arm, and the upper-side movable portion, wherein at least some of the basic cables are led out to an upper portion of the revolving drum from inside the base through the hollow portion, are bent so as to be routed to a rear side of the revolving drum and fixed, below the first arm, to the revolving drum by means of a first fixing member, are curved in a direction along the first arm and fixed to a side surface of the first arm by means of a second fixing member such that a certain length margin required for the operation of the first arm is provided between the first fixing member and the second fixing member, and are guided to the upper-side movable portion along the first arm; wherein the linear object is guided via the same path as the basic cable from inside the base and fixed at the position of the first fixing member, is subsequently extended forward beyond the basic cable, through a path closer to the first axis than the basic cable is, is curved in the direction along the first arm, is fixed to the side surface of the first arm, at the position of the second fixing member, such that a certain length margin required for the operation of the first arm is provided between the position of the first fixing member and the position of the second fixing member, and is guided to the upper-side movable portion along the first arm.

DETAILED DESCRIPTION

A linear-object management structure 1 for a robot 100 and an additional linear-object fixing member according to an embodiment of the present disclosure will be described below with reference to the drawings.

Figure 1:
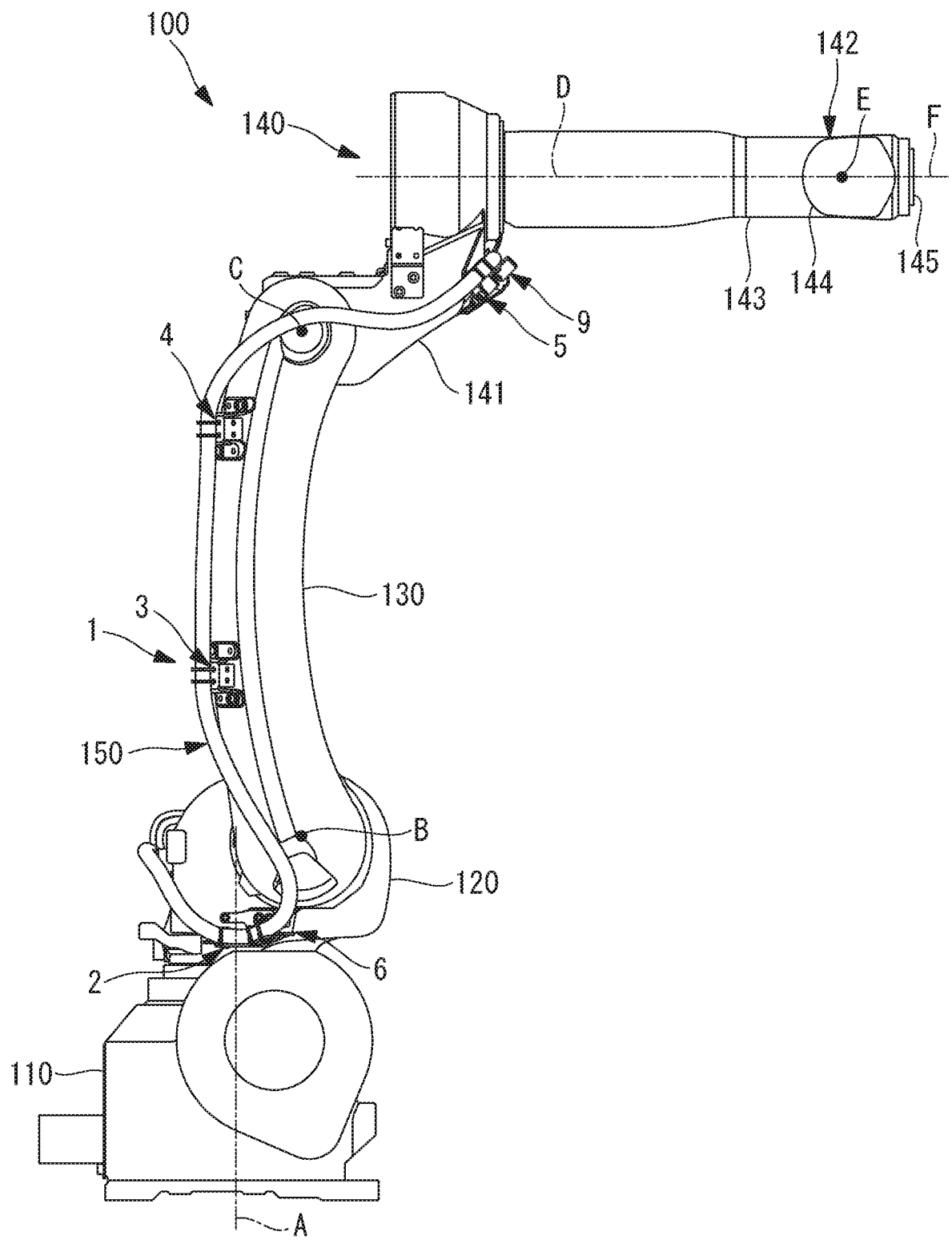
FIG. 1 is a side view showing a robot employing a linear-object management structure according to an embodiment of the present disclosure.
Figure 2:
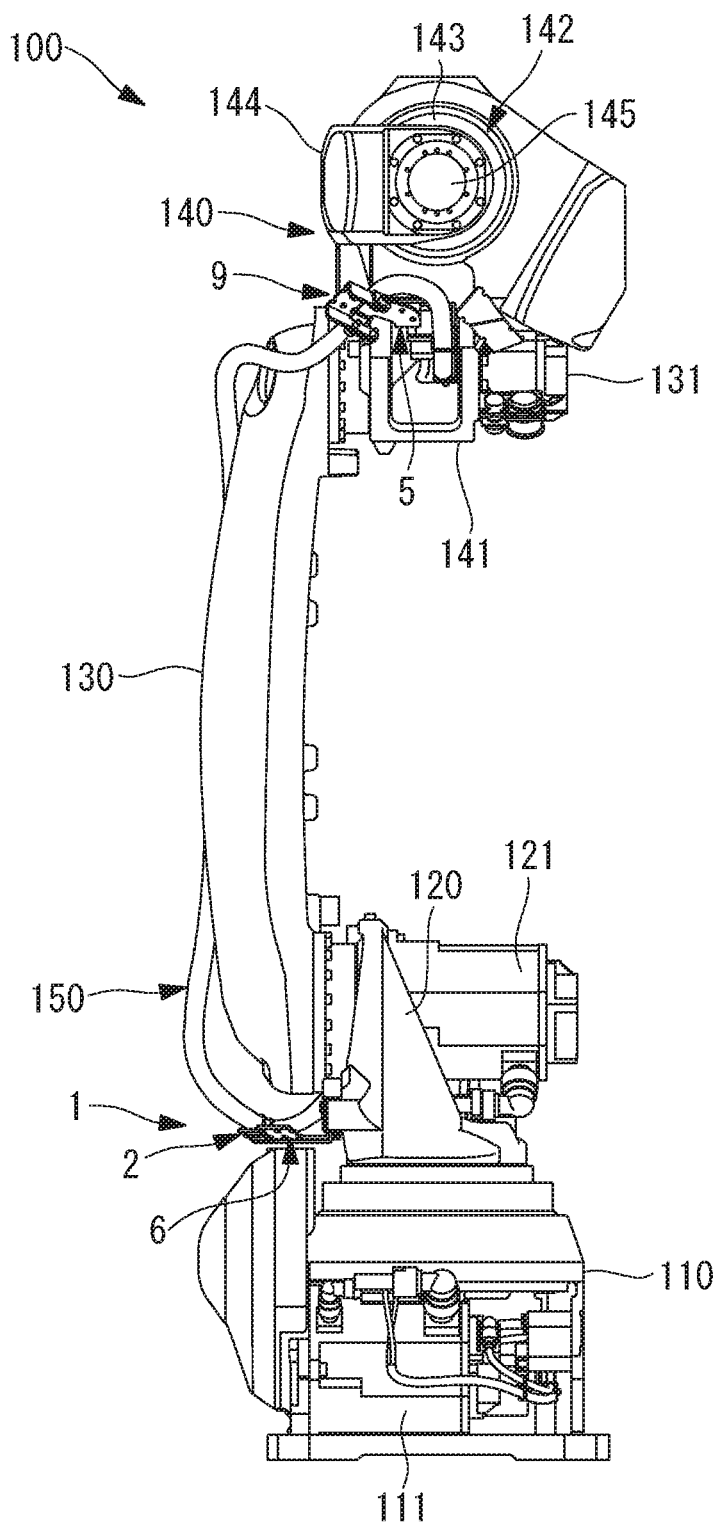
FIG. 2 is a front view of the robot in FIG. 1.

As shown in FIGS. 1 and 2, the robot 100 employing the linear-object management structure 1 according to this embodiment includes a base 110 that is installed on an installation surface, and a revolving drum 120 that is supported so as to be rotatable about a vertical first axis A with respect to the base 110.

The robot 100 includes a first arm 130 that is supported so as to be rotatable about a horizontal second axis B with respect to the revolving drum 120, and an upper-side movable portion 140 that is supported at the distal end of the first arm 130.

The upper-side movable portion 140 includes a second arm 141 that has a longitudinal axis and that is supported, at the distal end of the first arm 130, so as to be rotatable about a third axis C parallel to the second axis B, and a wrist unit 142 that is supported at the distal end of the second arm 141.

The wrist unit 142 includes a first wrist element 143, a second wrist element 144, and a third wrist element 145.

The first wrist element 143 is supported, at the distal end of the second arm 141, so as to be rotatable about a fourth axis D along the longitudinal axis. In addition, the second wrist element 144 is supported so as to be rotatable about a fifth axis E orthogonal to the fourth axis D, with respect to the first wrist element 143. In addition, the third wrist element 145 is supported so as to be rotatable about a sixth axis F orthogonal to the fifth axis E, with respect to the second wrist element 144.

As shown in FIG. 2, a motor 111 for rotationally driving the revolving drum 120 with respect to the base 110 is fixed to the base 110.

A motor 121 for rotationally driving the first arm 130 with respect to the revolving drum 120 is fixed to the revolving drum 120.

A motor 131 for rotationally driving the second arm 141 with respect to the first arm 130 is fixed to the second arm 141.

Three motors (not shown) for driving the wrist unit 142 are built into the second arm 141 and the first wrist element 143.

Figure 3:
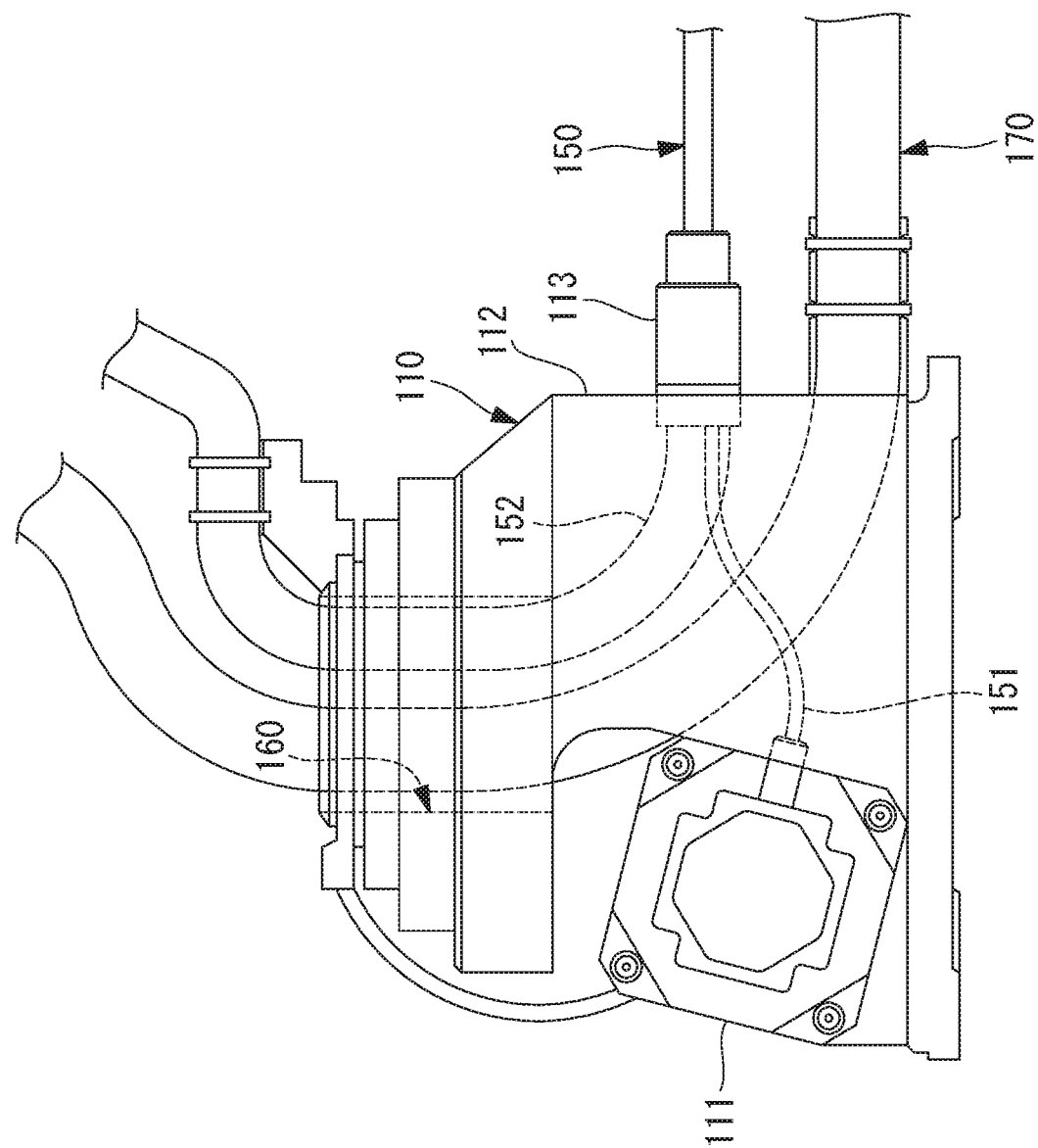
FIG. 3 is a diagram showing wiring paths of basic cables and a linear object in a base and a revolving drum of the robot in FIG. 1.

The robot 100 is provided with a basic cable 150 for transmitting motive power and control signals to the individual motors 111, 121, 131. As shown in FIG. 3, one end of the basic cable 150 is connected to a distribution board 112 provided on the back surface of the base 110 by means of a connector 113.

As shown in FIG. 3, in the basic cable 150, a cable 151 for the motor 111 that drives the revolving drum 120 is branched from another basic cable 152 and is connected to the motor 111 fixed to the base 110. The other basic cable 152 rises from the interior of the base 110 via a hollow portion 160 penetrating, in a vertical direction, through the base 110 and the revolving drum 120 in the vicinity of the first axis A, and is led out to an upper portion of the revolving drum 120.

Figure 4:
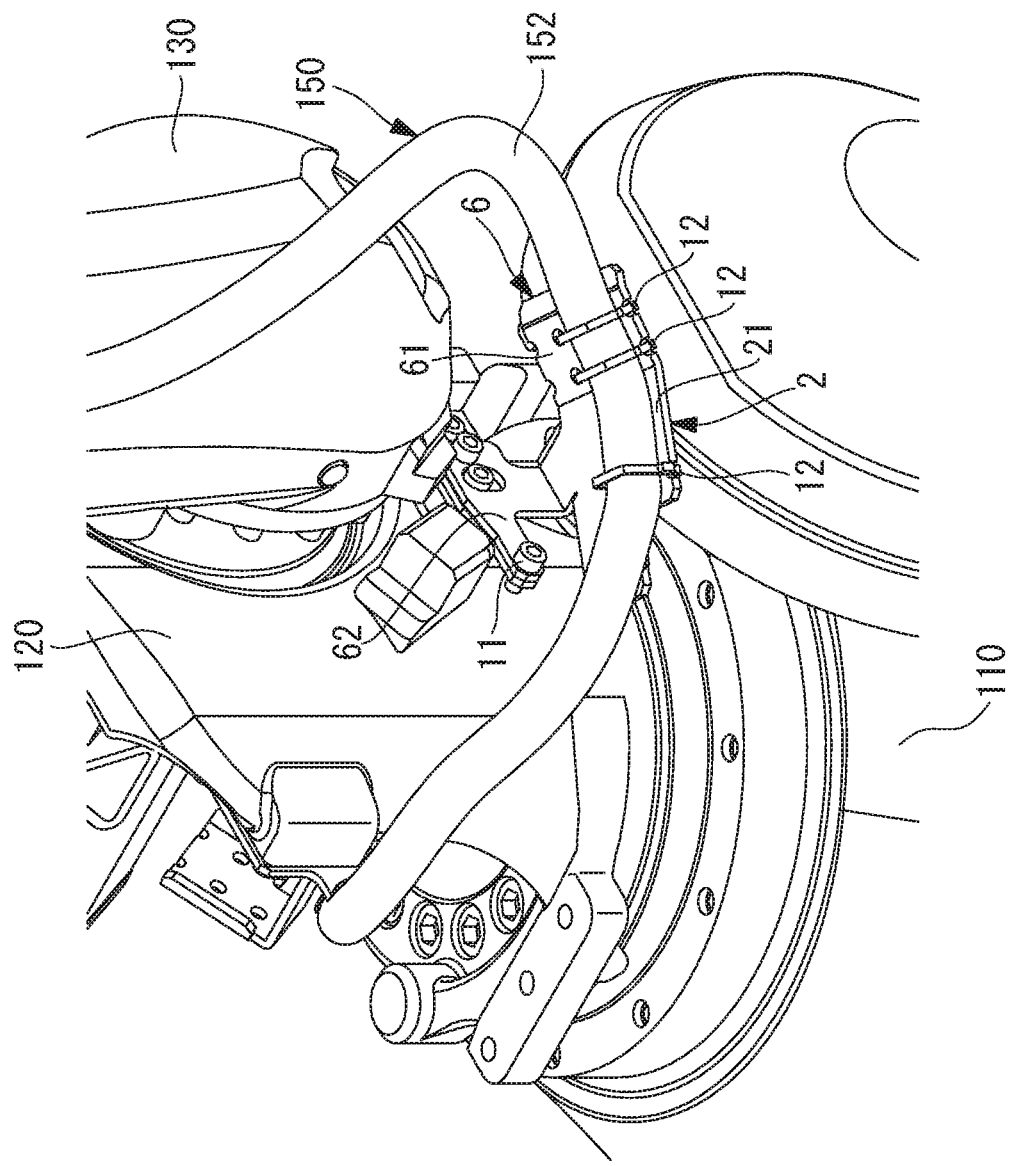
FIG. 4 is a perspective view showing the wiring path of a basic cable in an upper portion of the revolving drum of the robot in FIG. 1.

In the basic cable 150 that has been led out to the upper portion of the revolving drum 120, a cable for the motor 121 that drives the first arm 130 with respect to the revolving drum 120 is branched from the other basic cable 152 and is connected to the motor 121 fixed to the revolving drum 120. As shown in FIG. 4, the rest of the other basic cable 152 is bent so as to be routed to the rear side of the revolving drum 120 from the position at which said cable has been led out to the upper portion of the revolving drum 120, and is fixed, below the first arm 130, to a first fixing member (first fixing member, fixing member) 2 attached to the revolving drum 120, in the form in which said cable is extended substantially horizontally in an obliquely forward direction.

Figure 5:
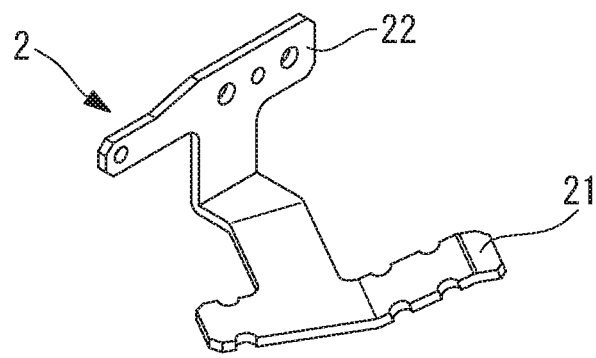
FIG. 5 is a perspective view showing a first fixing member for attaching the basic cable to the revolving drum of the robot in FIG. 1.

As shown in FIG. 5, the first fixing member 2 includes an attachment portion 22 that is fixed to the revolving drum 120 by means of bolts 11, and a plate-shaped fixing portion 21 that fixes the basic cable 150.

Figure 6:
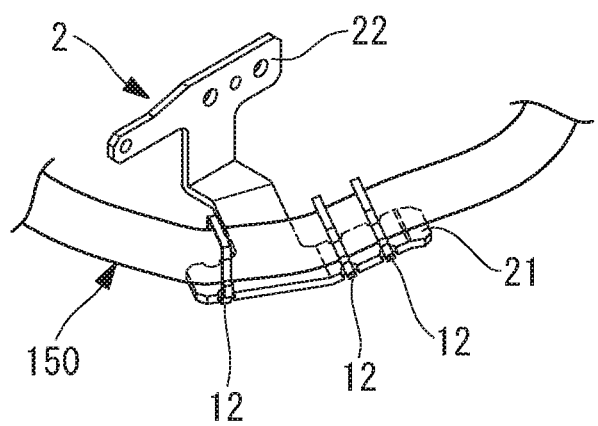
FIG. 6 is a perspective view showing a state in which the basic cable is fixed to the first fixing member in FIG. 5.

As shown in FIG. 6, the basic cable 150 is fixed to the first fixing member 2 by fastening the basic cable 150 and the fixing portion 21 of the first fixing member 2 together by using binding bands 12, in a state in which the basic cable 150 is disposed along the fixing portion 21.

As shown in FIG. 1, the basic cable 150 is curved upward in front of the first fixing member 2. By doing so, the basic cable 150 is guided in a direction along the first arm 130, and is fixed to a second fixing member (second fixing member, fixing member) 3 attached to a side surface of the first arm 130.

The basic cable 150 is fixed to the first fixing member 2 and the second fixing member 3 such that a certain length margin required for the operation of the first arm 130 is provided between the first fixing member 2 and the second fixing member 3. The basic cable 150 between the first fixing member 2 and the second fixing member 3 serves as a movable cable that deforms in accordance with the operation of the first arm 130. This portion of the basic cable 150 has sufficient durability even under repetitive operation of the first arm 130 by being fixed with the abovementioned margin.

Figure 7:
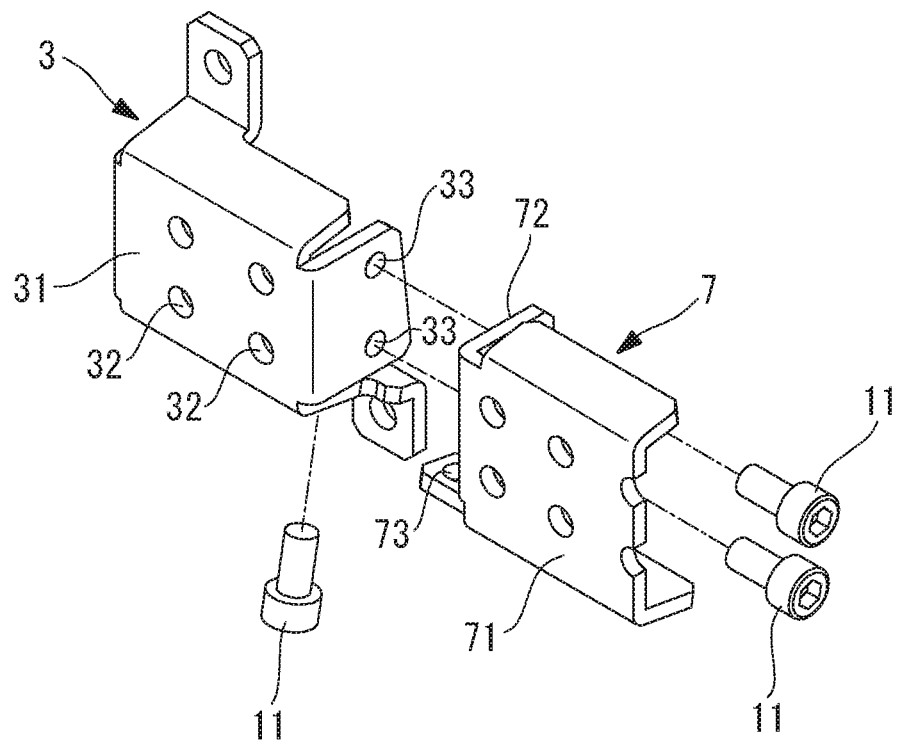
FIG. 7 is an exploded perspective view showing a second fixing member for attaching the basic cable to a first arm of the robot in FIG. 1, as well as a second additional fixing member used in the linear-object management structure according to this embodiment.

As shown in FIGS. 1 and 7, the second fixing member 3 includes a plate-shaped fixing portion 31 having a plurality of through-holes 32. The basic cable 150 is fixed to the second fixing member 3 by fastening the basic cable 150 and the fixing portion 31 of the second fixing member 3 together by using the binding bands 12 penetrating through the through-holes 32, in a state in which the basic cable 150 is extended in a longitudinal direction of the first arm 130 and is disposed along a surface of the fixing portion 31.

Figure 8:
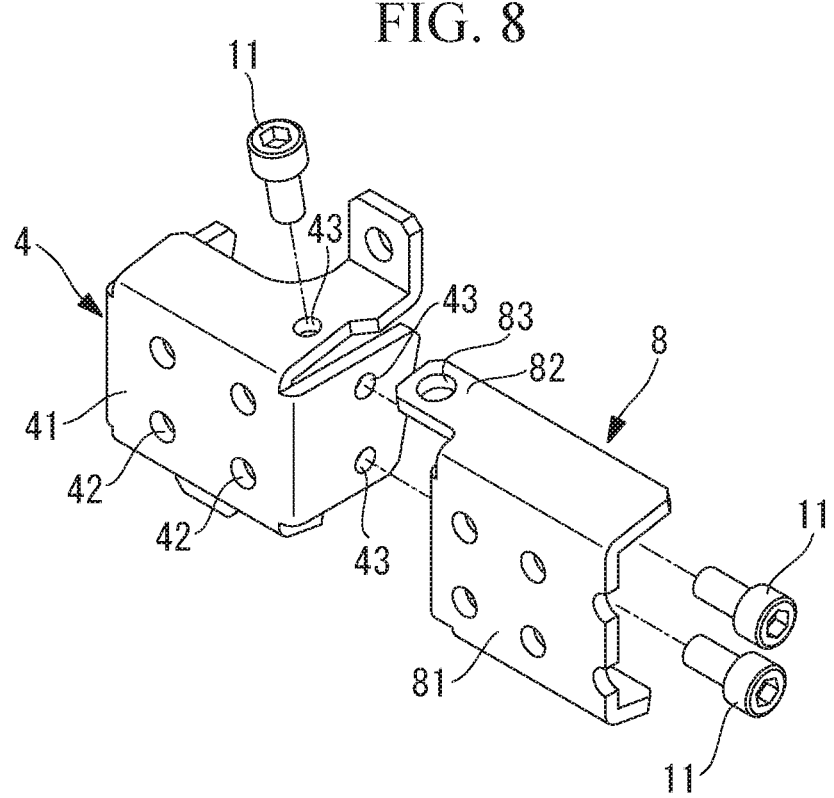
FIG. 8 is an exploded perspective view showing a third fixing member for attaching the basic cable to the first arm of the robot in FIG. 1, as well as a third additional fixing member used in the linear-object management structure according to this embodiment.

As shown in FIGS. 1 and 8, a third fixing member (fifth fixing member, fixing member) 4 is attached to the side surface of the first arm 130, with an interval in the longitudinal direction with respect to the second fixing member 3. The third fixing member 4 has substantially the same shape as that of the second fixing member 3. It is possible to firmly fix the basic cable 150 in a state in which the basic cable 150 is disposed along the longitudinal direction of the first arm 130 by individually fixing the basic cable 150 by using the binding bands 12 penetrating through the through-holes 32 and through-holes 42, in a state in which the basic cable 150 is disposed along the surfaces of the fixing portion 31 and a fixing portion 41 of the second fixing member 3 and the third fixing member 4 that are spaced apart in the longitudinal direction.

Figure 9:
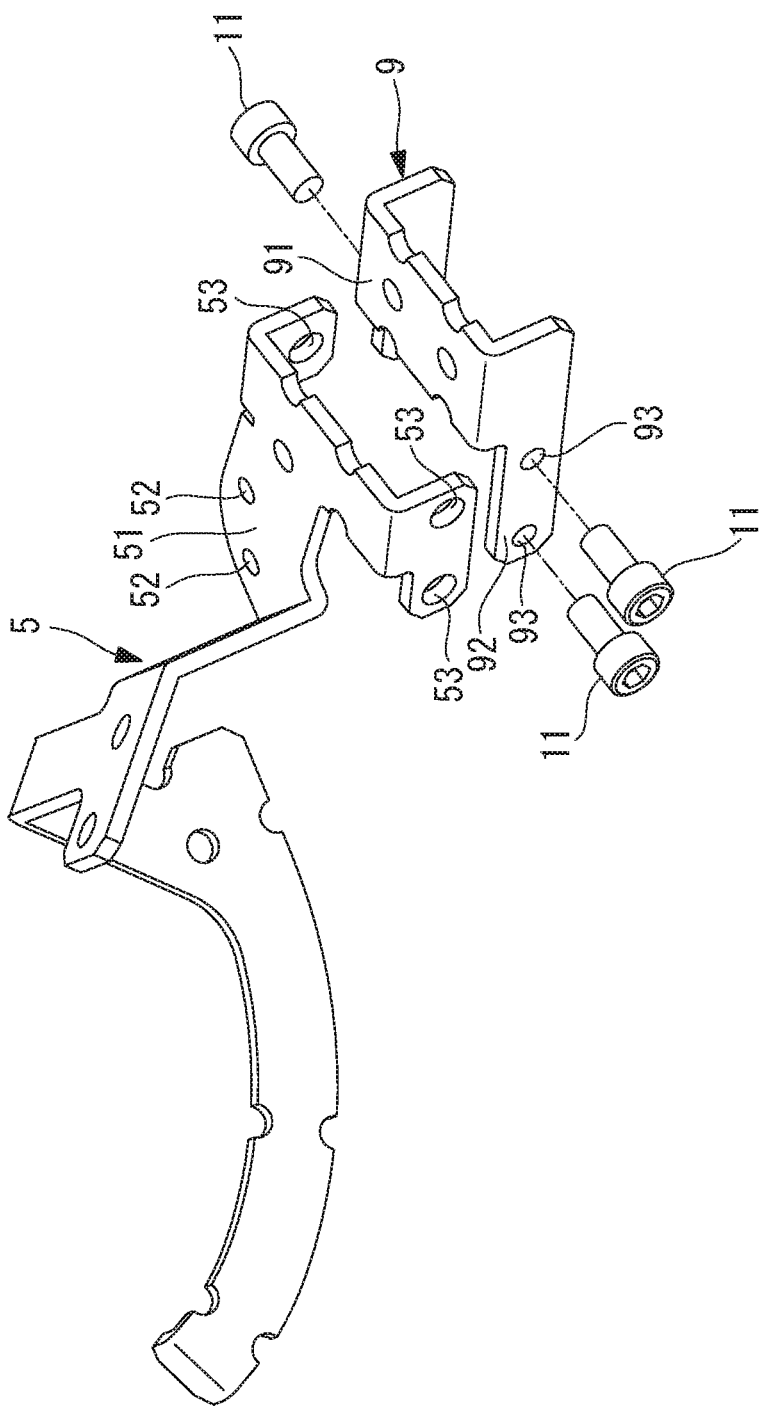
FIG. 9 is an exploded perspective view showing a fourth fixing member for attaching the basic cable to a second arm of the robot in FIG. 1, as well as a fourth additional fixing member used in the linear-object management structure according to this embodiment.

As shown in FIGS. 1 and 9, a fourth fixing member (sixth fixing member, fixing member) 5 is attached to the front surface of the second arm 141. The basic cable 150 is also fixed to the fourth fixing member 5 such that a certain length margin required for the operation of the second arm 141 with respect to the first arm 130 is provided between the third fixing member 4 and the fourth fixing member 5.

The fourth fixing member 5 also includes a plate-shaped fixing portion 51 having a plurality of through-holes 52. The basic cable 150 is fixed to the fourth fixing member 5 by fastening the basic cable 150 and the fixing portion 51 together by using the binding bands 12 penetrating through the through-holes 52, in a state in which the basic cable 150 is disposed along a surface of the fixing portion 51.

The basic cable 150 fixed to the fourth fixing member 5 is branched to be connected to the motor 131 for individually driving the second arm 141 and the three wrist elements 143, 144, 145.

The linear-object management structure 1 according to this embodiment is a structure for managing a post-attached linear object 170 mounted on the abovementioned robot 100. The post-attached linear object 170 is, for example, one or more cables or tubes for supplying motive power, control signals, compressed air or cooling media, etc. to a tool (not shown) attached at the distal end of the wrist unit 142, and is mounted on the robot 100 by a user.

As shown in FIG. 3, the post-attached linear object 170 is inserted into the base 110 from the position of the distribution board 112 on the back surface of the base 110, and is guided to the position of the first fixing member 2 on the revolving drum 120 via the same path as the basic cable 150 from inside the base 110.

Figure 10:
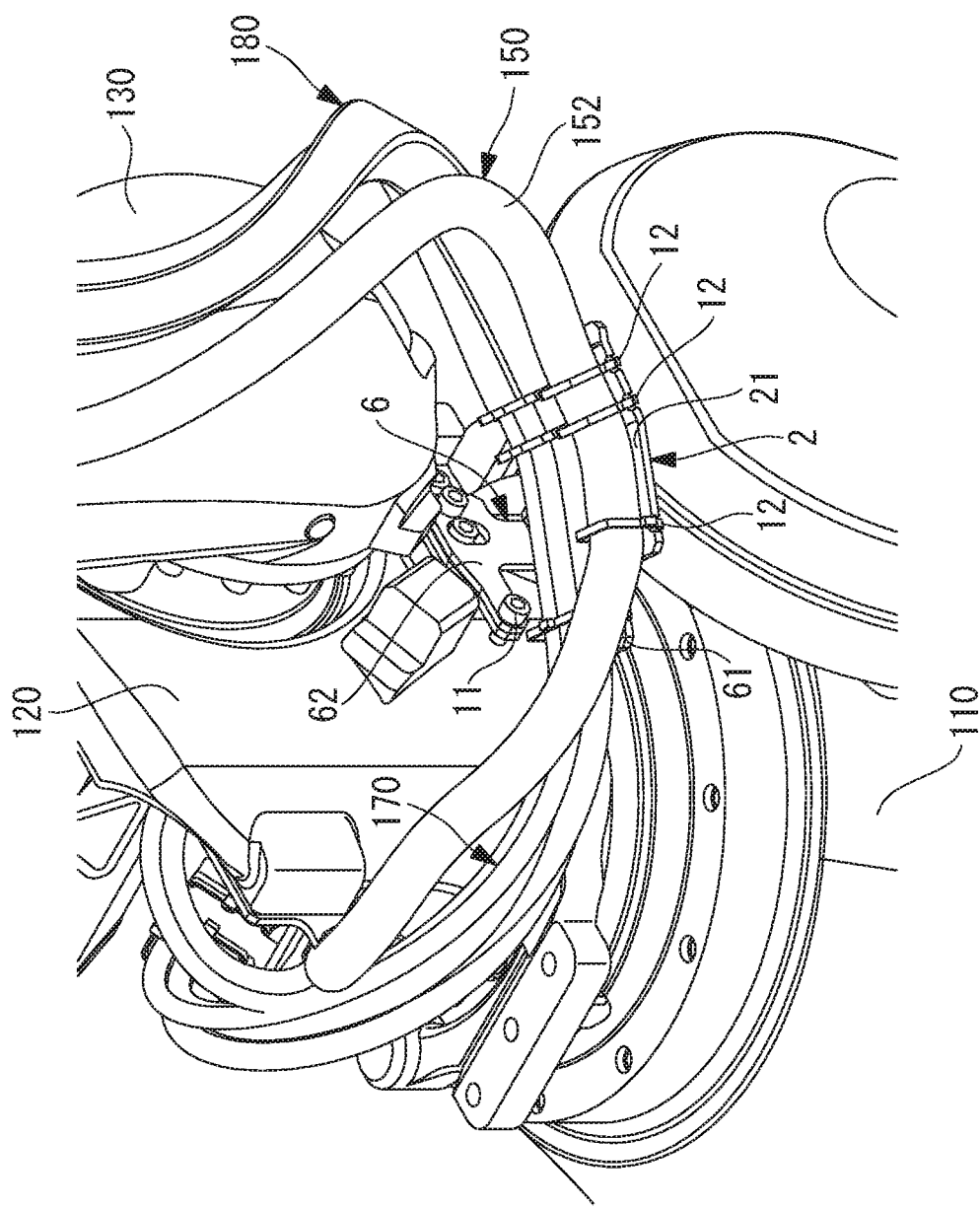
FIG. 10 is a perspective view showing, in the linear-object management structure according to this embodiment, a wiring path of a post-attached linear object in the upper portion of the revolving drum of the robot.
Figure 11:
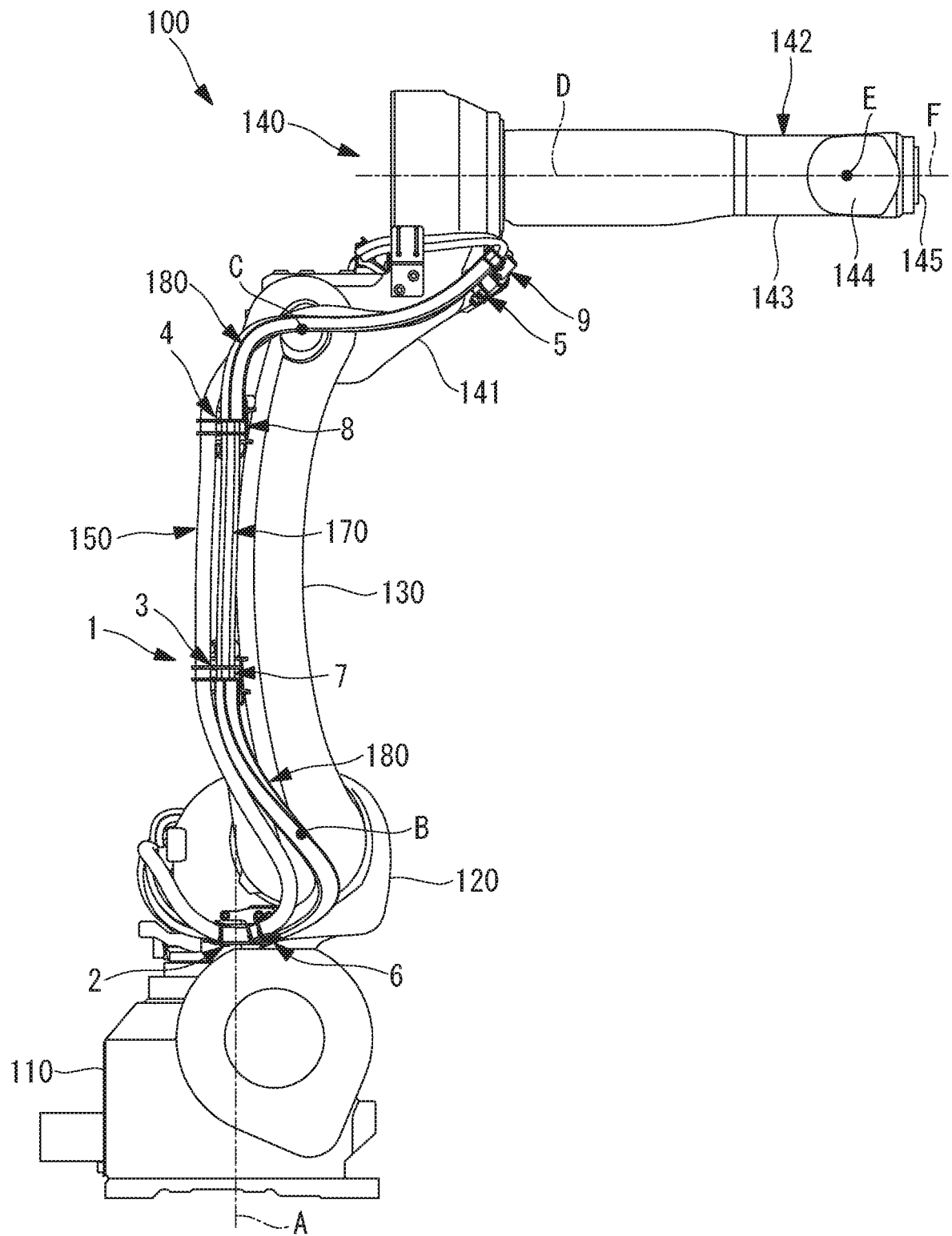
FIG. 11 is a side view showing the linear-object management structure according to this embodiment.
Figure 12:
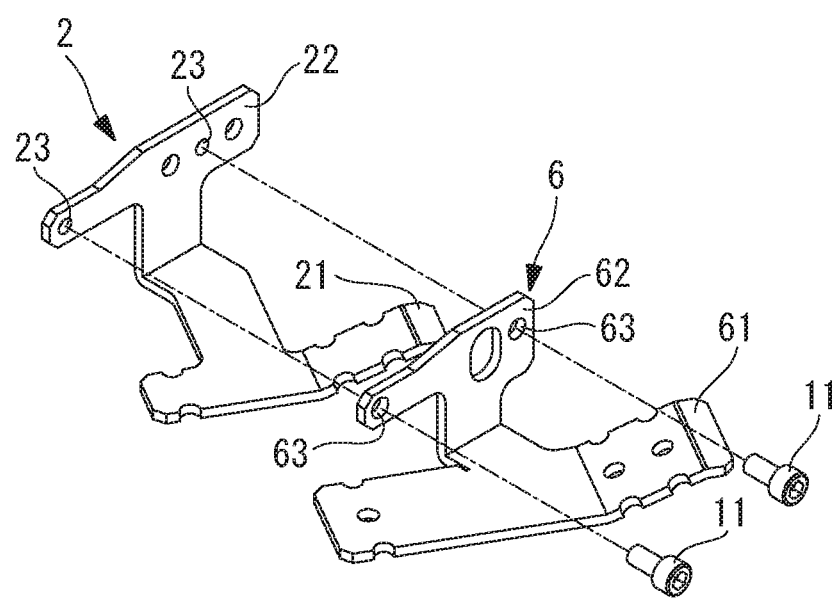
FIG. 12 is an exploded perspective view showing the first fixing member for attaching the basic cable to the revolving drum of the robot in FIG. 1, as well as a first additional fixing member used in the linear-object management structure according to this embodiment.

In other words, the post-attached linear object 170 is led out to the upper portion of the revolving drum 120 from inside the base 110 via the hollow portion 160 that vertically penetrates through the base 110 and the revolving drum 120 in the vicinity of the first axis A. Then, as shown in FIGS. 10 and 11, the post-attached linear object 170 is bent so as to be routed to the rear side of the revolving drum 120 from the position at which the post-attached linear object 170 has been led out to the upper portion of the revolving drum 120, and is guided to the positions of the first fixing member 2, the second fixing member 3, the third fixing member 4, and the fourth fixing member 5.

As shown in FIGS. 7 to 9 and FIGS. 12 to 16, a first additional fixing member (third fixing member, additional linear-object fixing member) 6 to a fourth additional fixing member (eighth fixing member, additional linear-object fixing member) 9 are attached to the first fixing member 2 to the fourth fixing member 5. In the same manner as the individual fixing members 2, 3, 4, 5, the individual additional fixing members 6, 7, 8, 9 according to this embodiment include plate-shaped fixing portions 61, 71, 81, 91 that fix the linear object 170 by means of the binding bands 12, and attachment portions 62, 72, 82, 92 for fixing the fixing portions 61, 71, 81, 91 to the fixing members 2, 3, 4, 5.

The individual fixing members 2, 3, 4, 5 are provided with a plurality of screw holes (fasteners) 23, 33, 43, 53, and the attachment portions 62, 72, 82, 92 of the individual additional fixing members 6, 7, 8, 9 are provided with a plurality of through-holes 63, 73, 83, 93 at a pitch coinciding with the pitch of the screw holes 23, 33, 43, 53. As shown in FIGS. 13 to 16, the individual additional fixing members 6, 7, 8, 9 can be fixed to the corresponding fixing members 2, 3, 4, 5 by overlaying the attachment portions 62, 72, 82, 92 on the fixing members 2, 3, 4, 5 so that the through-holes 63, 73, 83, 93 are aligned with the screw holes 23, 33, 43, 53, and by screwing the bolts (fasteners) 11 penetrating through the through-holes 63, 73, 83, 93 into the screw holes 23, 33, 43, 53.

With this embodiment, as shown in FIGS. 13 to 16, when the individual additional fixing members 6, 7, 8, 9 are fixed to the corresponding fixing members 2, 3, 4, 5, the fixing portions 61, 71, 81, 91 of the individual additional fixing members 6, 7, 8, 9 are arranged so as to be parallel to the fixing portions 21, 31, 41, 51 of the corresponding fixing members 2, 3, 4, 5. In other words, when the post-attached linear object 170 is fixed to the fixing portions 61, 71, 81, 91 of the individual additional fixing members 6, 7, 8, 9 by means of the binding bands 12, as shown in FIG. 11, the post-attached linear object 170 can be disposed at a position parallel to and proximate to the basic cable 150 fixed to the fixing portions 21, 31, 41, 51 of the corresponding fixing members 2, 3, 4, 5.

Figure 13:
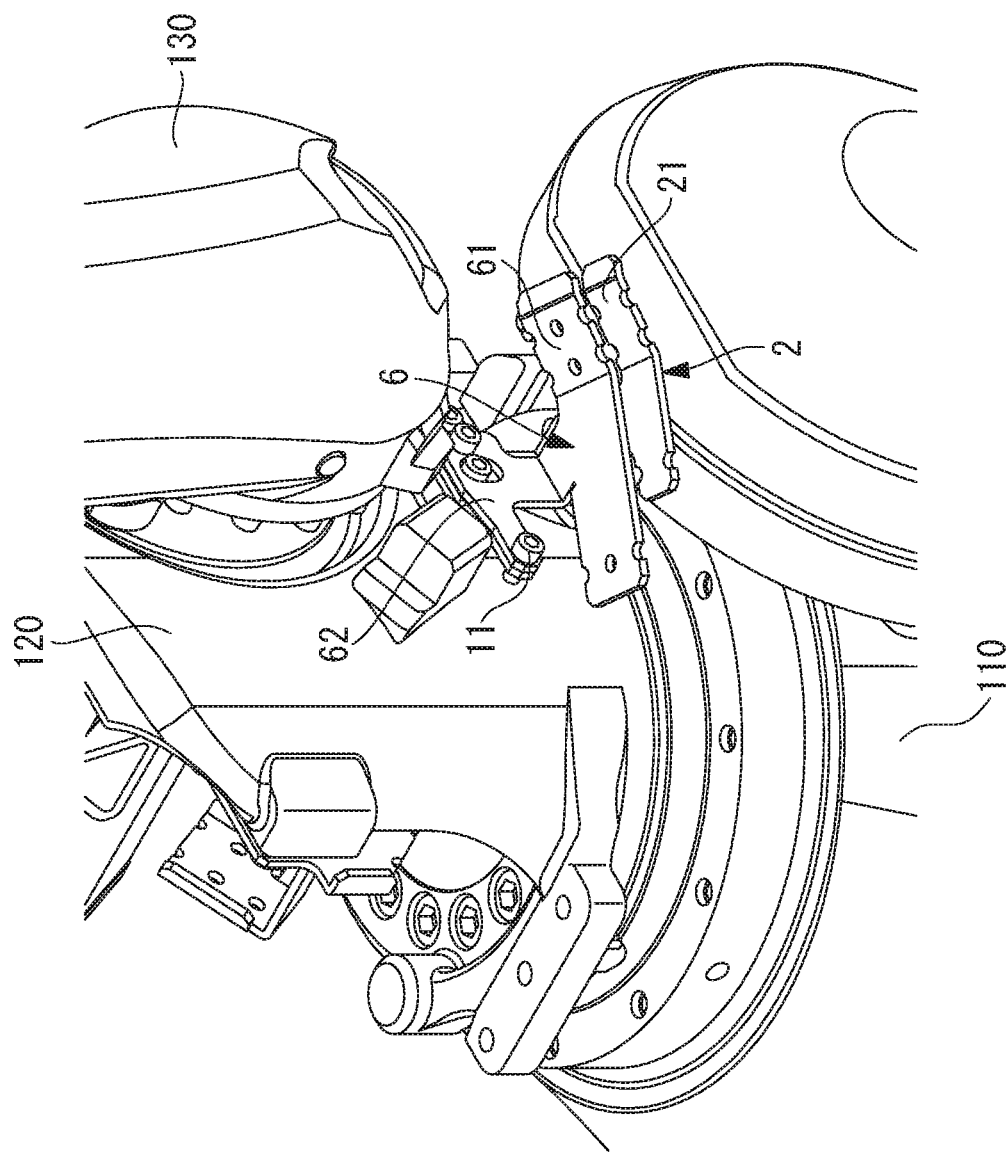
FIG. 13 is a perspective view showing a state in which the first additional fixing member is fixed to the first fixing member in the linear-object management structure in FIG. 10.
Figure 14:
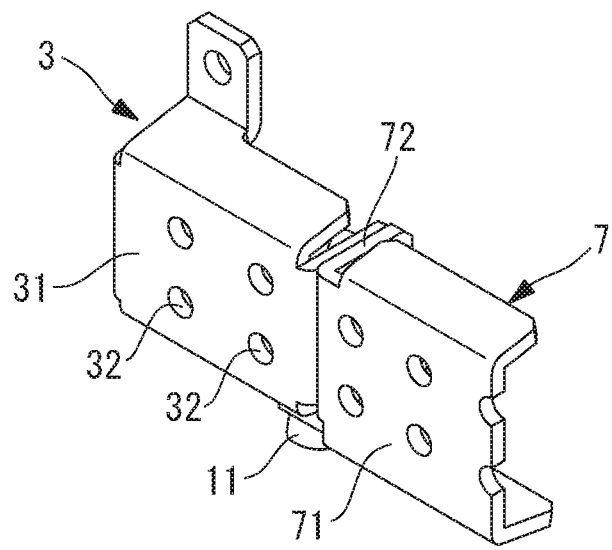
FIG. 14 is a perspective view showing a state in which the second additional fixing member is fixed to the second fixing member in FIG. 7.
Figure 15:
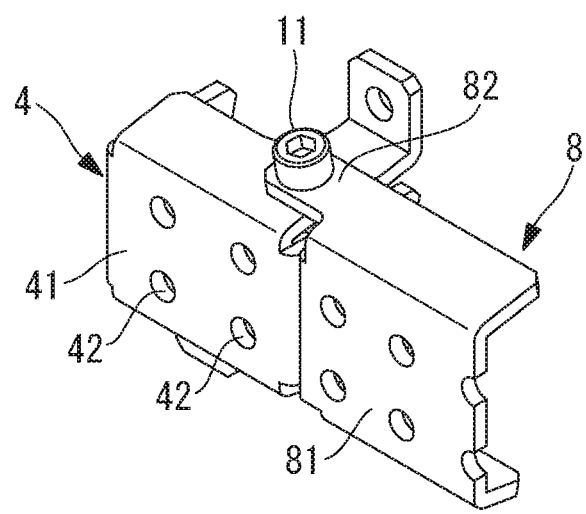
FIG. 15 is a perspective view showing a state in which the third additional fixing member is fixed to the third fixing member in FIG. 8.
Figure 16:
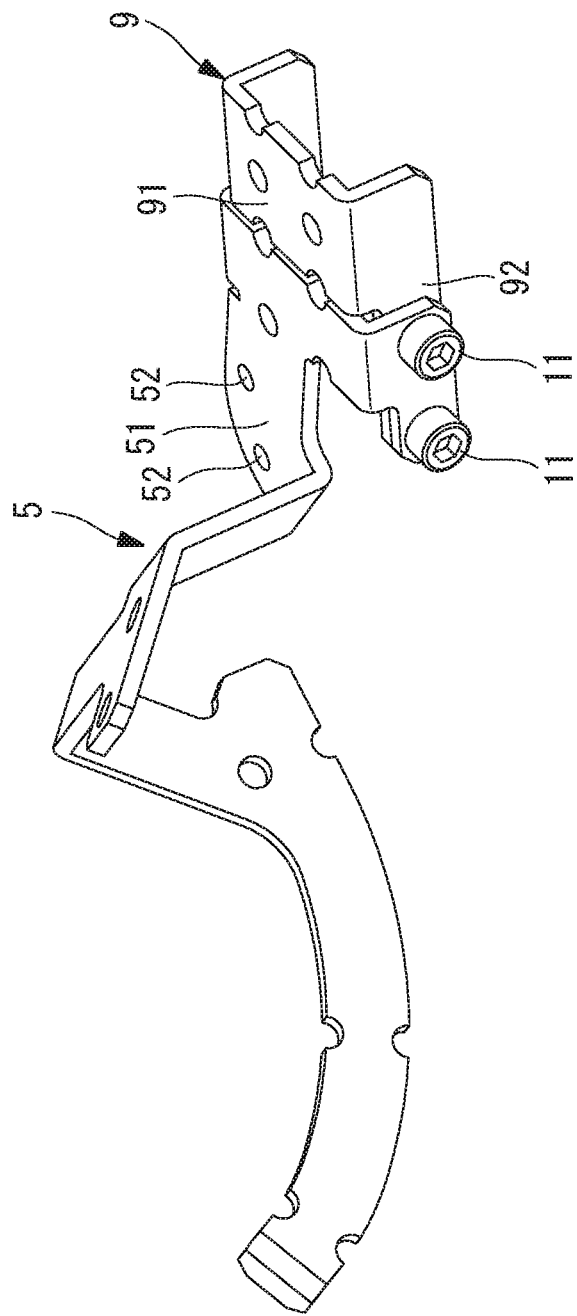
FIG. 16 is a perspective view showing a state in which the fourth additional fixing member is fixed to the fourth fixing member in FIG. 9.

In this embodiment, as shown in FIG. 13, when the first additional fixing member 6 is fixed to the first fixing member 2, the fixing portion 61 of the first additional fixing member 6 is disposed at a position adjacent to the first axis A side of the fixing portion 21 of the first fixing member 2. By doing so, as shown in FIG. 10, the post-attached linear object 170 that is fixed to the fixing portion 61 of the first additional fixing member 6 by means of the binding bands 12 can be disposed so as to be parallel to the basic cable 150, in a path closer to the first axis A than the basic cable 150 is.

Furthermore, as shown in FIG. 11, the post-attached linear object 170 fixed to the first additional fixing member 6 is curved in front of the basic cable 150 in the direction along the first arm 130, and is fixed to the second additional fixing member 7 on the first arm 130 such that a certain length margin required for the operation of the first arm 130 is provided.

In addition, as shown in FIG. 11, the second additional fixing member 7 and the third additional fixing member 8 fix the post-attached linear object 170 at positions parallel to, in an obliquely forward direction, the positions at which the basic cable 150 is fixed to the second fixing member 3 and the third fixing member 4.

Then, the post-attached linear object 170 fixed to the third additional fixing member 8 is fixed to the fourth additional fixing member 9 fixed to the second arm 141 such that a certain length margin required for the operation of the second arm 141 with respect to the first arm 130 is provided.

In the figures, reference sign 180 indicates covers that respectively cover the linear object 170 disposed between the first additional fixing member 6 and the second additional fixing member 7 and the linear object 170 disposed between the third additional fixing member 8 and the fourth additional fixing member 9.

As described above, with the linear-object management structure 1 for the robot 100 according to this embodiment, the post-attached linear object 170 that has been inserted into the base 110 is led out to the upper portion of the revolving drum 120 via the hollow portion 160 that is formed by penetrating from the base 110 to the revolving drum 120, and is fixed to the first additional fixing member 6 fixed to the first fixing member 2. As a path to the first additional fixing member 6, the post-attached linear object 170 is guided via the same path as the basic cable 150; thus, a user can perform wiring work for the post-attached linear object 170, without hesitation, by using the already attached basic cable 150 as a reference.

By leading the post-attached linear object 170 through the hollow portion 160 penetrating in the vicinity of the first axis A, it is possible to reduce the load applied to the post-attached linear object 170 in the same manner as the basic cable 150, even when the revolving drum 120 rotates with respect to the base 110. Furthermore, by fixing the first additional fixing member 6 to the first fixing member 2, it is also possible to determine the position at which the post-attached linear object 170 is fixed to the first additional fixing member 6 by using the basic cable 150 as a reference, and a user can fix the post-attached linear object 170 thereto without hesitation.

The post-attached linear object 170 that is fixed at the position of the first fixing member 2 by means of the first additional fixing member 6 is extended forward beyond the basic cable 150, through a path closer to the first axis A than the basic cable 150 is. As a result, it is possible to prevent the post-attached linear object 170, in a region between the first additional fixing member 6 and the second additional fixing member 7, from expanding more outward than the basic cable 150 in the width direction as a result of rotation of the first arm 130 with respect to the revolving drum 120. By doing so, it is possible to prevent, in a more reliable manner, interference with a peripheral object as a result of the linear object 170 expanding by a large amount outward in the width direction during rotation of the first arm 130.

The post-attached linear object 170 disposed between the first additional fixing member 6 and the second additional fixing member 7 is curved in front of the basic cable 150 disposed between the first fixing member 2 and the second fixing member 3. By doing so, it is possible to prevent interference between the post-attached linear object 170 and the basic cable 150, even if the linear object 170 expands outward in the width direction during rotation of the first arm 130.

Because the path of the post-attached linear object 170 from the first additional fixing member 6 to the second additional fixing member 7 is also substantially the same as that of the basic cable 150, a user can perform wiring work therefor without hesitation. Furthermore, it is possible to reduce the load applied to the linear object 170 in the same manner as the basic cable 150, even with the operation of the first arm 130.

Because the fixing portions 71, 81 of the second additional fixing member 7 and the third additional fixing member 8 are arranged in an obliquely forward direction relative to the fixing portions 31, 41 of the second fixing member 3 and the third fixing member 4 in this embodiment, it is possible to prevent the post-attached linear object 170 from overhanging by a large amount in the width direction of the robot 100, thereby preventing interference with a peripheral object in a more reliable manner.

As described above, there is an advantage in that the post-attached linear object 170 can be easily attached even by a user who has no special skill in linear-object management, and in that it is possible to reduce the load acting on the linear object 170 as a result of the operation of the robot 100 and to avoid interference with a peripheral object.

Note that, although a case in which a user performs wiring work for the post-attached linear object 170 by fixing the post-attached linear object 170 to the additional fixing members, sequentially from the first additional fixing member 6 fixed to the first fixing member 2 to the fourth additional fixing member 9 fixed to the fourth fixing member 5, by using the binding bands 12 has been illustrated as an example in this embodiment, the present invention is not limited thereto. In other words, the first additional fixing member 6 to the fourth additional fixing member 9 may be fixed, in advance, at appropriate positions on the post-attached linear object 170 by means of the binding bands 12.

In this case, a user performing the wiring work can lead the post-attached linear object 170 into the same proper path as described above merely by sequentially fixing the first additional fixing member 6 to the fourth additional fixing member 9, which are fixed to the post-attached linear object 170 in advance, at prescribed positions on the first fixing member 2 to the fourth fixing member 5 by means of the bolts 11. In other words, by doing so, there is an advantage in that the user can perform the wiring work in a simpler manner, without measuring the length of the linear object 170 or performing work for fastening with the binding bands 12. Furthermore, it is needless to say that the linear object 170 may be fixed with, for example, a sheet metal component via an elastic body, or any other means may be employed instead of the binding bands 12.

The form of the robot 100 illustrated in this embodiment is merely one example, and the present invention may be applied to the robot 100 in any other forms. In addition, the shapes of the fixing members 2, 3, 4, 5 and the additional fixing members 6, 7, 8, 9 illustrated in this embodiment are merely one example, and any other shapes may be employed within a range that does not depart from the scope of the present invention.

Figure 17:
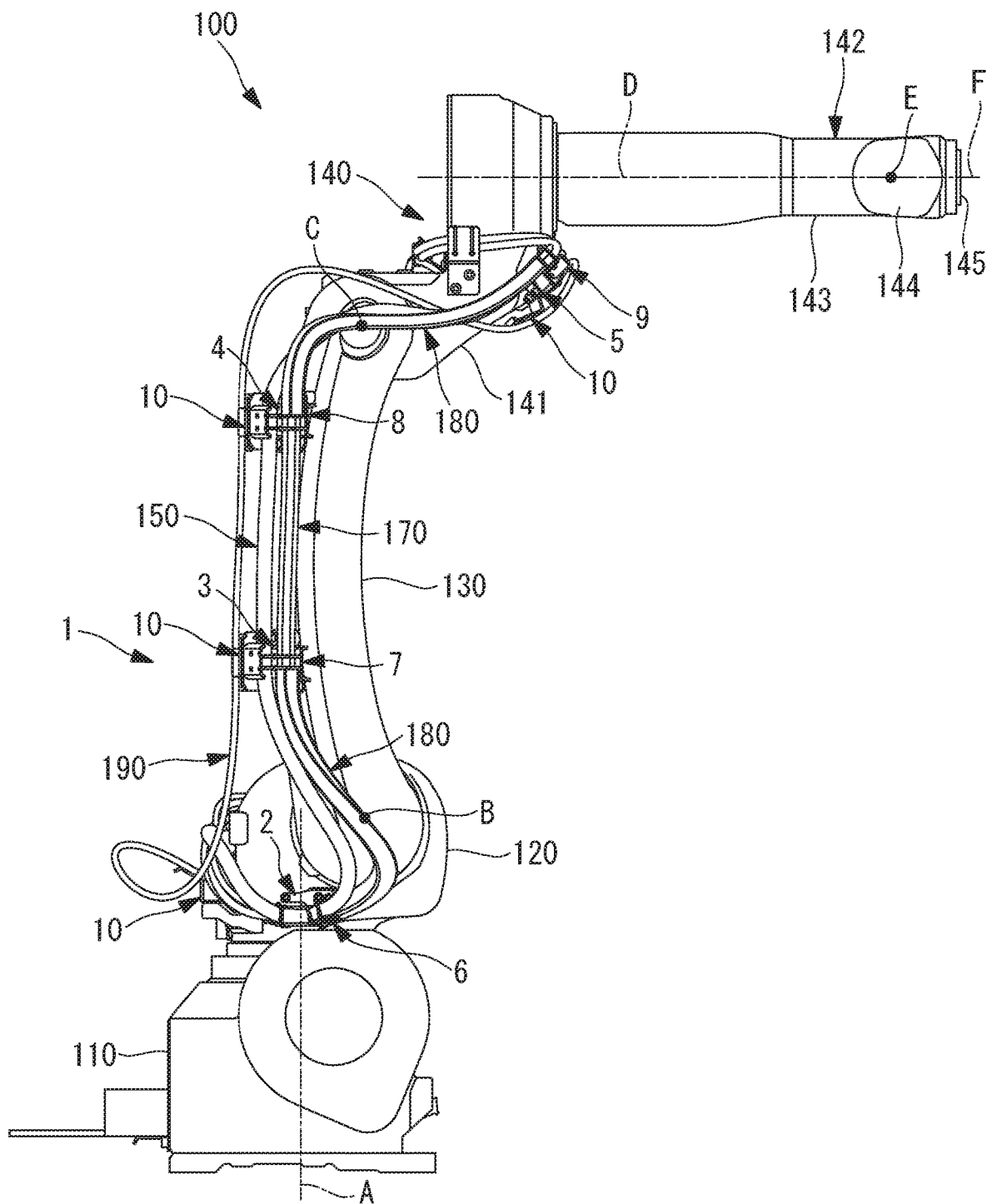
FIG. 17 is a side view showing a state in which another linear object is attached to the robot in FIG. 11.

The type and the number of the post-attached linear object 170 may be arbitrarily determined. In a case in which a post-attached linear object 190 is further added after the post-attached linear object 170 is added, as shown in FIG. 17, other additional fixing members 10 may be respectively attached to the first fixing member 2 to the fourth fixing member 5 and any other positions.

REFERENCE SIGNS LIST 1 linear-object management structure
2 first fixing member (first fixing member, fixing member)
3 second fixing member (second fixing member, fixing member)
4 third fixing member (fifth fixing member, fixing member)
5 fourth fixing member (sixth fixing member, fixing member)
6 first additional fixing member (third fixing member, additional linear-object fixing member)
7 second additional fixing member (fourth fixing member, additional linear-object fixing member)
8 third additional fixing member (seventh fixing member, additional linear-object fixing member)
9 fourth additional fixing member (eighth fixing member, additional linear-object fixing member)
11 bolt (fastener)
23, 33, 43, 53 screw hole (fastener)
61, 71, 81, 91 fixing portion
62, 72, 82, 92 attachment portion
100 robot
110 base
120 revolving drum
130 first arm
140 upper-side movable portion
141 second arm
150 basic cable
160 hollow portion
170 linear object
A first axis
B second axis
C third axis

The invention claimed is:

1. A robot linear-object management structure for managing a post-attached linear object mounted on a robot, comprising:
a base that is installed on an installation surface; a revolving drum that is supported so as to be rotatable about a vertical first axis with respect to the base; a first arm that is supported so as to be rotatable about a horizontal second axis with respect to the revolving drum; an upper-side movable portion that is supported at a distal end of the first arm; a hollow portion that penetrates upward from the base through the revolving drum along the first axis; and basic cables for driving the revolving drum, the first arm, and the upper-side movable portion, wherein at least some of the basic cables are led out to an upper portion of the revolving drum from inside the base through the hollow portion, are bent so as to be routed to a rear side of the revolving drum and fixed, below the first arm, to the revolving drum by a first fixing member, are curved in a direction along the first arm and fixed to a side surface of the first arm by a second fixing member such that a certain length margin required for an operation of the first arm is provided between the first fixing member and the second fixing member, and are guided to the upper-side movable portion along the first arm, wherein the linear object is guided via the same path as the basic cable from inside the base and fixed at a position of the first fixing member, is subsequently extended forward beyond the basic cable, through a path closer to the first axis than the basic cable is, is curved in the direction along the first arm, is fixed to the side surface of the first arm, at a position of the second fixing member, such that a certain length margin required for the operation of the first arm is provided between the position of the first fixing member and the position of the second fixing member, and is guided to the upper-side movable portion along the first arm.

2. The robot linear-object management structure according to claim 1, wherein the linear object is fixed at the position of the second fixing member so as to be disposed in front of and parallel to the basic cable.

3. The robot linear-object management structure according to claim 1, wherein a third fixing member for fixing the linear object at the position of the first fixing member and a fourth fixing member for fixing the linear object at the position of the second fixing member are fixed to the linear object in advance.

4. The robot linear-object management structure according to claim 3, wherein:

the third fixing member is fixed to the first fixing member by a fastener; and the fourth fixing member is fixed to the second fixing member by a fastener.

5. The robot linear-object management structure according to claim 1, wherein:

the upper-side movable portion comprises a second arm that is supported, at the distal end of the first arm, so as to be rotatable about a third axis parallel to the second axis;

the basic cable is fixed to the side surface of the first arm, in the vicinity of the distal end of the first arm, by a fifth fixing member, and is fixed to a side surface of the second arm by a sixth fixing member such that a certain length margin required for an operation of the second arm is provided between the fifth fixing member and the sixth fixing member; and the linear object is fixed at a position of the fifth fixing member, and is fixed to the side surface of the second arm such that a certain length margin required for the operation of the second arm is provided between the position of the fifth fixing member and a position of the sixth fixing member.

6. The robot linear-object management structure according to claim 5, wherein a seventh fixing member for fixing the linear object at the position of the fifth fixing member and an eighth fixing member for fixing the linear object to the side surface of the second arm are fixed to the linear object in advance.

* * * * *